United States Patent
Emma et al.

(10) Patent No.: US 6,262,885 B1
(45) Date of Patent: Jul. 17, 2001

(54) PORTABLE COMPUTING DEVICE HAVING A DISPLAY MOVABLE THEREABOUT

(75) Inventors: Philip George Emma, Danbury, CT (US); Robert Kevin Montoye, New York, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/195,735

(22) Filed: Nov. 19, 1998

(51) Int. Cl.[7] ............................................. G06F 1/16
(52) U.S. Cl. .................... 361/683; 361/679; 361/681; 361/686
(58) Field of Search .................................. 361/679–681, 361/683, 686

(56) References Cited

U.S. PATENT DOCUMENTS

| | | | |
|---|---|---|---|
| 4,926,010 | 5/1990 | Citron | 178/18 |
| 5,103,376 | 4/1992 | Blonder | 361/393 |
| 5,224,060 | 6/1993 | Ma | 364/708 |
| 5,229,920 * | 7/1993 | Spaniol et al. | 361/393 |
| 5,241,303 * | 8/1993 | Register et al. | 340/706 |
| 5,255,214 | 10/1993 | Ma | 364/708.1 |
| 5,264,992 | 11/1993 | Hogdahl et al. | 367/681 |
| 5,268,817 | 12/1993 | Miyagawa et al. | 361/729 |
| 5,375,076 | 12/1994 | Goodrich et al. | 364/708.1 |
| 5,410,447 | 4/1995 | Miyagawa et al. | 361/681 |
| 5,481,430 | 1/1996 | Miyagawa et al. | 361/681 |
| 5,494,447 | 2/1996 | Zaidan | 439/31 |
| 5,668,570 * | 9/1997 | Ditzik | 345/173 |
| 5,682,182 | 10/1997 | Tsubosaka | 345/173 |
| 5,708,560 | 1/1998 | Kumar et al. | 361/680 |

FOREIGN PATENT DOCUMENTS

98/23382   11/1998   (WO) .

OTHER PUBLICATIONS

Vadem Mobile Computing and Communications Solutions Publication, "Clio(TM) the ideal PC Companion from Vadem(TM)," http://www.vadem/com/main_clio.html, San Jose, CA (1998), pp. 1–17.

* cited by examiner

Primary Examiner—Leo P. Picard
Assistant Examiner—Yean-Hsi Chang
(74) Attorney, Agent, or Firm—Heslin & Rothenberg, P.C.; Paul Otterstedt, Esq.

(57) ABSTRACT

A portable computing device includes a processing unit coupled with a keyboard, a recording medium, and a display. The keyboard and the recording medium form portions of a support structure of the device and are generally directed in different directions. The recording medium is configured to receive input from a stylus operated by a user. The display is movable (e.g., pivotable and/or translatable) about the support structure to selectively suit use of the display in conjunction with the keyboard or use of the display in conjunction with the stylus and the recording medium. An elongatable arm can serve to connect the display with the support structure.

24 Claims, 8 Drawing Sheets

PORTABLE COMPUTING DEVICE HAVING A DISPLAY MOVABLE THEREABOUT

CROSS-REFERENCE TO RELATED APPLICATION

This application contains subject matter which is related to the subject matter of the following application, which is assigned to the same assignee as this application. The below-listed application is hereby incorporated herein by reference in its entirety:

"FLEXIBLY INTERFACEABLE PORTABLE COMPUTING DEVICE," by Karidis et al., Ser. No. 09/070,391, filed Apr. 30, 1998.

TECHNICAL FIELD

This invention relates, generally, to portable computers and, more particularly, to movable displays for portable computers having a keyboard and a handwriting recording medium.

BACKGROUND ART

Many users find a laptop or notebook computer to be convenient because of its portabability. For instance, a user may take the portable computer out of the office or away from standard power outlets and continue to enjoy the processing capabilities of the computer.

Earlier portable computers employing a keyboard have presented difficulties to the user in confined spaces, such as in an airplane. Typically, the larger the physical size of a laptop computer, the less likely the computer may be opened and used when space behind the computer is limited.

Exemplary computing devices employing a display, a keyboard, and a handwriting recording unit are disclosed in the above-incorporated application Ser. No. 09/070,391. For instance, such a computerized recording unit may digitize text concurrently with hand writing thereof so that the handwritten text may be processed as data. The digitization equipment may, for example, employ a digitizing tablet to generate data that represents coordinates of an electronic stylus applied thereto.

However, it remains desirable to provide refinements which allow, for example, use of just the capabilities of the recording unit and the display in a compact arrangement, while the keyboard remains available to be used with the display at a later time. For instance, an executive at a meeting may desire to use the capabilities of only the recording unit and the display during the meeting. So, an exposure or visible presence of the keyboard may undesirably occupy table, lap, or desk space, and may disadvantageously create or imply crowding or cluttering.

Thus, a need exists for a display offering improved movability of the display about a computing device having a keyboard. A further need exists for a portable computing device allowing enhanced usability in confined spaces. Also, a need exists for a computing device whose display may be moved to promote usability of the computing device despite or in view of limitations of space to the rear of the computing device. Another need exists for a computing device having display, keyboarding, and recording capabilities, and presenting decreased weight or profile. A still further need exists for a computing device with display, keyboarding, and recording capabilities, and offering increased speed or integration of functions.

SUMMARY OF THE INVENTION

Pursuant to the present invention, shortcomings of the existing art are overcome and additional advantages are provided through the provision of a portable computing device having a display movable thereabout.

In one aspect of the invention, a portable computing device includes a support structure having a body. A first face portion of the body is generally directed in a first direction. A second face portion of the body is generally directed in a second direction, which is different from the first direction. A processing unit is supported with the body. A keyboard is coupled with the processing unit and forms the first face portion of the body. The keyboard is configured to communicate a first datum to the processing unit in response to user operation of the keyboard. A recording medium is coupled with the processing unit and forms the second face portion of the body. The recording medium is configured to communicate a second datum to the processing unit in response to user operation of a stylus when the recording medium is superimposed with the stylus. A display is coupled with the processing unit and is movably connected with the body. The display is movable to a first location and a second location. The first location of the display allows user viewing of the display during user operation of the keyboard. The second location of the display allows user viewing of the display during user operation of the stylus.

The display can be pivotable and/or translatable to the first location and the second location.

In another aspect of the invention, a portable computing device includes a support structure having a body. A processing unit is supported with the body. A keyboard is coupled with the processing unit and is connected with the body. The keyboard is configured to communicate a datum to the processing unit in response to user operation of the keyboard. An elongatable arm is connected with the body. A display is coupled with the processing unit and is connected with the elongatable arm. The elongatable arm allows relative movement between the display and the body along a longitudinal axis of the elongatable arm to move the display to a selected location. The selected location of the display allows user viewing of the display during user operation of the keyboard.

The display can be foldable against a part of the body.

The invention further contemplates a portable computing method. A keyboard is employed to form a first face portion of a body of a support structure. The first face portion of the body is generally directed in a first direction. A recording medium is employed to form a second face portion of the body. The second face portion of the body is generally directed in a second direction, which is different from the first direction. The recording medium is configured to receive a signal from user operation of a stylus when the recording medium is superimposed with the stylus. A display is movably connected with the body. The display is movable to a first location and a second location. The first location of the display allows user viewing of the display during user operation of the keyboard. The second location of the display allows user viewing of the display during user operation of the stylus.

The display can be employed to allow user viewing of a first visual element responsive to user operation of the keyboard. The display can be employed to allow user viewing of a second visual element responsive to user operation of the stylus.

Thus, the present invention advantageously provides a display movable to selected locations for allowing use of the display with a keyboard or a recording medium, where the keyboard and the recording medium are generally directed in different directions. An elongatable arm allows selective movement of a display about a portable computing device. The display is foldable to the portable computing device. The present invention reduces bulkiness and increases convenience in creating, carrying, and utilizing records.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a portable computing device having a display movable thereabout is provided.

Figure 1:
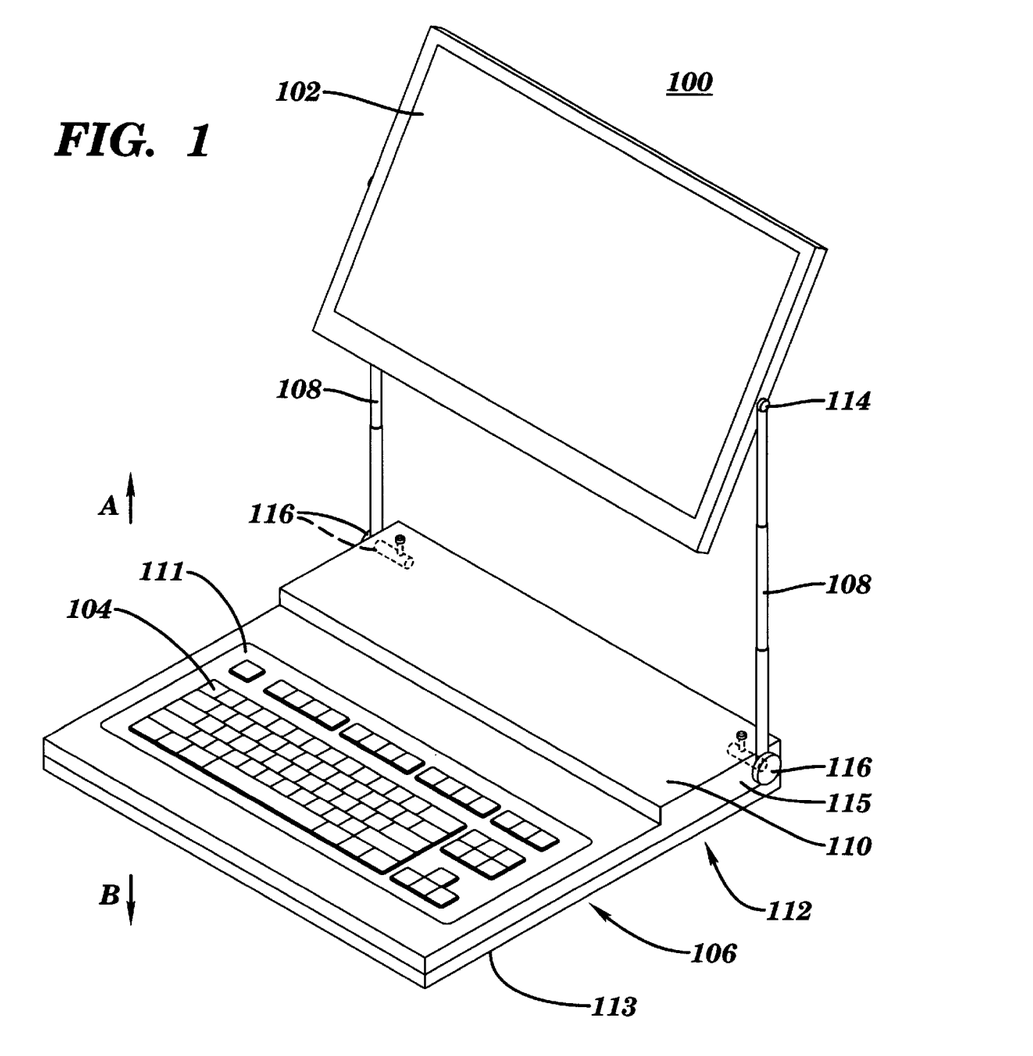
FIG. 1 is a perspective view of one example of a portable computing device including a display, elongatable arms, a keyboard, and a recording medium, illustrating the display pivoted and translated above the keyboard.

Referring to FIG. 1, portable computing device 100, in one example, includes display 102, keyboard 104, and recording medium 106. A number of (e.g., two) instances of arm 108 serve to allow movement of display 102 with respect to body 110 of support structure 112 of portable computing device 100. Keyboard 104 forms a first face portion 111, generally directed in a first direction "A", of body 110. Recording medium 106 forms a second face portion 113, generally directed in a second direction "B", of body 110. The second direction "B" is different from, e.g. opposite, the first direction "A".

Further referring to FIG. 1, arm 108 comprises an extendable, telescopic, shortenable, elongatable, foldable, unfoldable, and/or collapsible arm. Arm 108 is formed with any number of desired configurations and/or (e.g., circular or rectangular) cross sections. Arm 108 is pivotally connected with display 102 and body 110. For instance, distal pivot joint (e.g., hinge or swivel) 114 serves to pivotally connect arm 108 with display 102. Proximal pivot joint (e.g., hinge or swivel) 116, for example, serves to pivotally connect arm 108 with an outermost side face 115 of body 110. Arm 108, distal pivot joint 114, and proximal pivot joint 116 allow user translation and/or pivoting of display 102 with respect to body 110, keyboard 104, and/or recording medium 106, as described herein.

Again referring to FIG. 1, display 102, in one example, includes a thin film transistor liquid crystal display ("TFTLCD"). Display 102 presents an exemplary aspect ratio such as 16×9. Keyboard 104 comprises, for instance, a QWERTY keyboard mounted in body 110. Exemplary description of recording medium 106 is presented further below.

Referring still to FIG. 1, portable computing device 100 advantageously allows use of display 102 in conjunction with keyboard 104 notwithstanding space limitations such as obstructions or restrictions of rearward movement of display 102. For instance, such space limitations typically occur in an airplane, lecture hall, bus, automobile, other forms of mass transportation, or additional confined settings and the like.

For example, referring to FIG. 1, a user may desire to type at keyboard 104 and view display 102 while seated in a seat of an airplane located directly behind one or more other seats or structures of the airplane. Desirably, the user prepares to position the user's hands to type upon keyboard 104 while seated in the airplane seat by raising display 102 from or adjusting display 102 relative to body 110, and pivoting display 102 with respect to body 110 and/or arm 108, for enhanced interfacing and/or ergonomics between the user and portable computing device 100. In one example, portable computing device 100 employs display 102 to visually stimulate, prompt, coordinate, gather, chart, track, evaluate, or respond to user input received through keyboard 104 or recording medium 106. Exemplary visual elements include graphics, text, and the like.

Referring to FIG. 1, proximal pivot joint 116 allows pivoting of arm 108 connected with display 102. For example, proximal pivot joint allows the user to rest portable computing device 100 upon the user's lap or another surface (e.g., a collapsible tray table on an airplane) and pivot arm 108 and display 102 to avoid collision between display 102 and an obstruction located near or ahead of a seat in which the user is seated, such as when elongating arm 108.

Furthermore, still referring to FIG. 1, the user extends arms 108, for example, to translate display 102 away from body 110 and keyboard 104 and cause display 102 to be nearer to, or in greater alignment with, the user's eyes. For example, arms 108 are lengthened along a longitudinal axis of arms 108. Such longitudinal movement of display 102 occurs simultaneously, serially, or intermittently in conjunction with pivoting of display 102 to obtain a desired or strategic positioning between keyboard 104 and display 102, such as to enhance posture of the user. For instance, with arms 108 partially or fully extended, distal pivot joint 114 allows display 102 to be tilted to enhance user viewing thereof.

Again referring to FIG. 1, arm 108, in one example, exhibits a rigidity which serves to enhance steadiness of display 102 for user viewing thereof and/or to promote durability of portable computing device 100 such as by withstanding fatigue owing to repeated occurrences of extending, moving, and collapsing arm 108 for use, transport, and storage of portable computing device 100. For example, arm 108 includes a plurality of sections designed to telescope within one another. Arm 108 includes a number of segments which are connected (e.g., hinged) together in series, in parallel, or in a variation or combination of serial and parallel arrangement. For instance, arm 108 is formed with a material such as steel.

Figure 2:
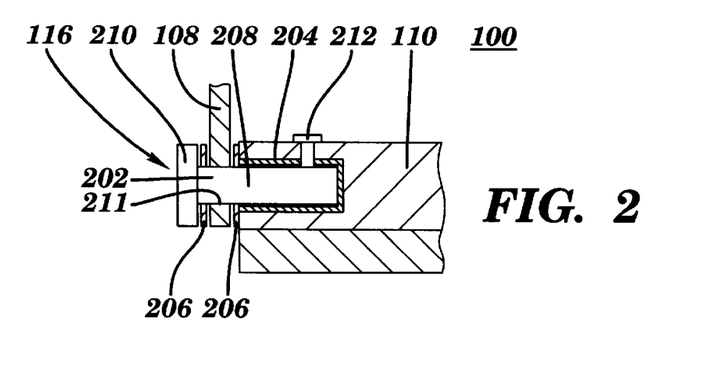
FIG. 2 is a sectional, elevation, front representation of one example of a movable connection between one of the elongatable arms and a support structure of the portable computing device of FIG. 1.

Turning to FIG. 2, proximal pivot joint 116, in one example, includes connector or bolt 202 received in recess 204 formed in body 110. For instance, arm 108 is in abutment with or sandwiched by one or more washers 206. Arm 108 is located between a section of rod 208 of bolt 202 received in recess 204 and head 210 of bolt 202 extending outward from recess 204. Bolt 202 extends through a hole 211 of arm 108 to provide pivotal movement and/or support of arm 108 with respect to body 110. For example, fastener or set screw 212 extends through an opening in body 110 to fix rod 208 of bolt 202 in recess 204. Proximal pivot joint 116 is located at any desired position of body 110.

Figure 3:
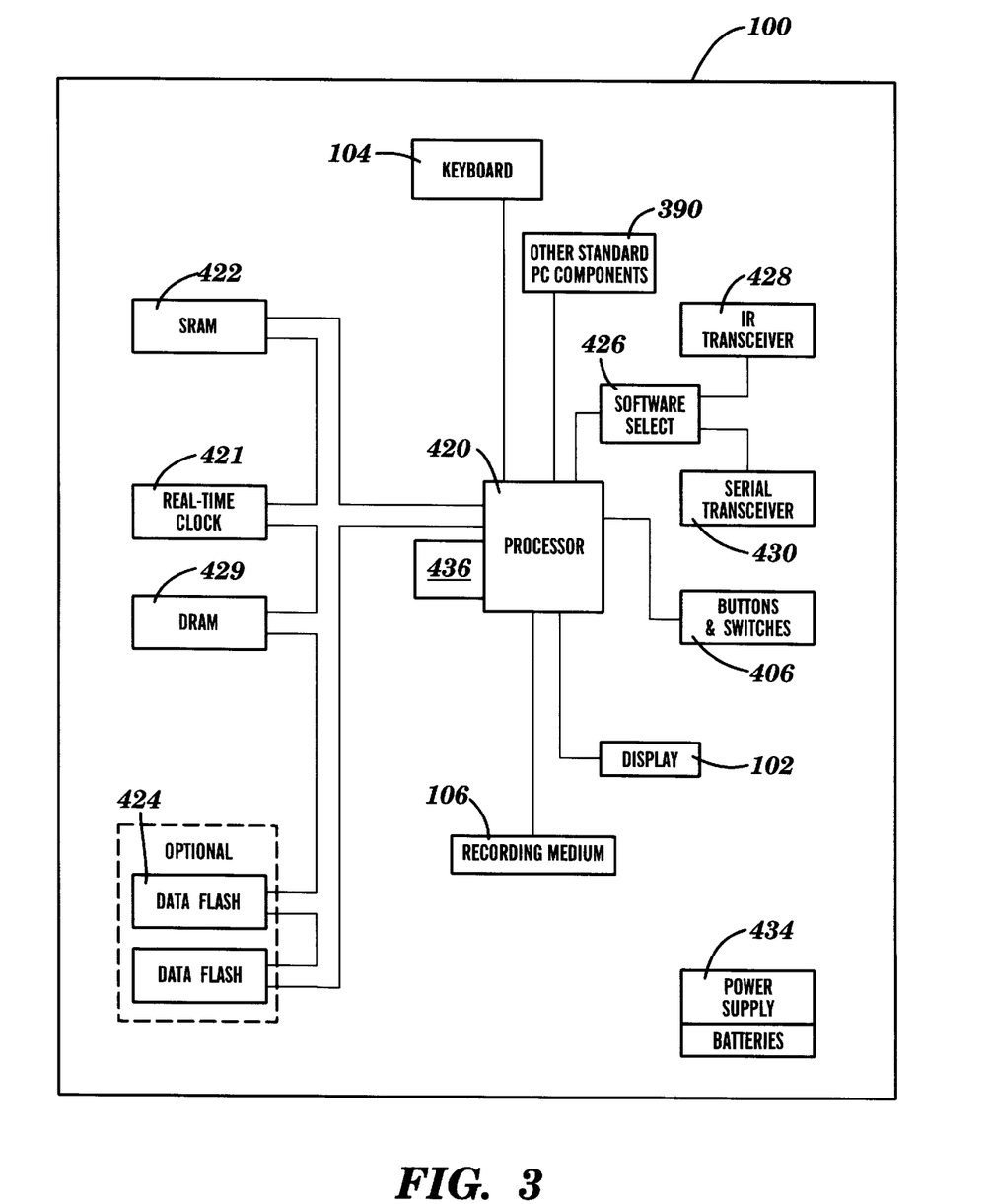
FIG. 3 illustrates a first partial block diagram of one example of components of the portable computing device of FIG. 1.

Now referring to FIG. 3, portable computing device 100 includes processing unit 420, which is coupled to, for example, display 102, keyboard 104, recording medium 106, one or more data storage devices 422, 424, and 429, a number of logic design implementations 436, a real-time clock 421, software select 426, infrared transceiver 428, serial transceiver 430, electrical source 434, and (e.g., physical or "soft") buttons or switches 406. For instance, serial transceiver 430 includes an RS-232, USB, and/or IEEE 1394 serial port. Software select 426 serves as an I/O interface. Processing unit 420 is coupled to buttons or switches 406 and use software stored in data storage devices 422, 424, and 429 to manage operation of the above-listed components, other standard PC components 390, and the like. In one example, user operation of certain of one or more buttons or switches 406 serve to select use of display 102 in conjunction with either keyboard 104 or else recording medium 106. Display 102 is coupled with processing unit 420, for instance, by a cable extending through a hollow or passage in arm 108 (FIG. 1). In another example, a user selectively connects a CD ROM or the Internet to a port of portable computing device 100 and (e.g., overnight) load data, such as several HD DVD movies, onto a (e.g., 17 mm thick) hard drive of portable computing device 100, for access to and/or display of the data as desired. Additional discussion of exemplary components is presented below with reference to FIG. 5. Further details concerning exemplary interconnection and operation of such components are provided in the above-incorporated application Ser. No. 09/070,391.

Figure 4:
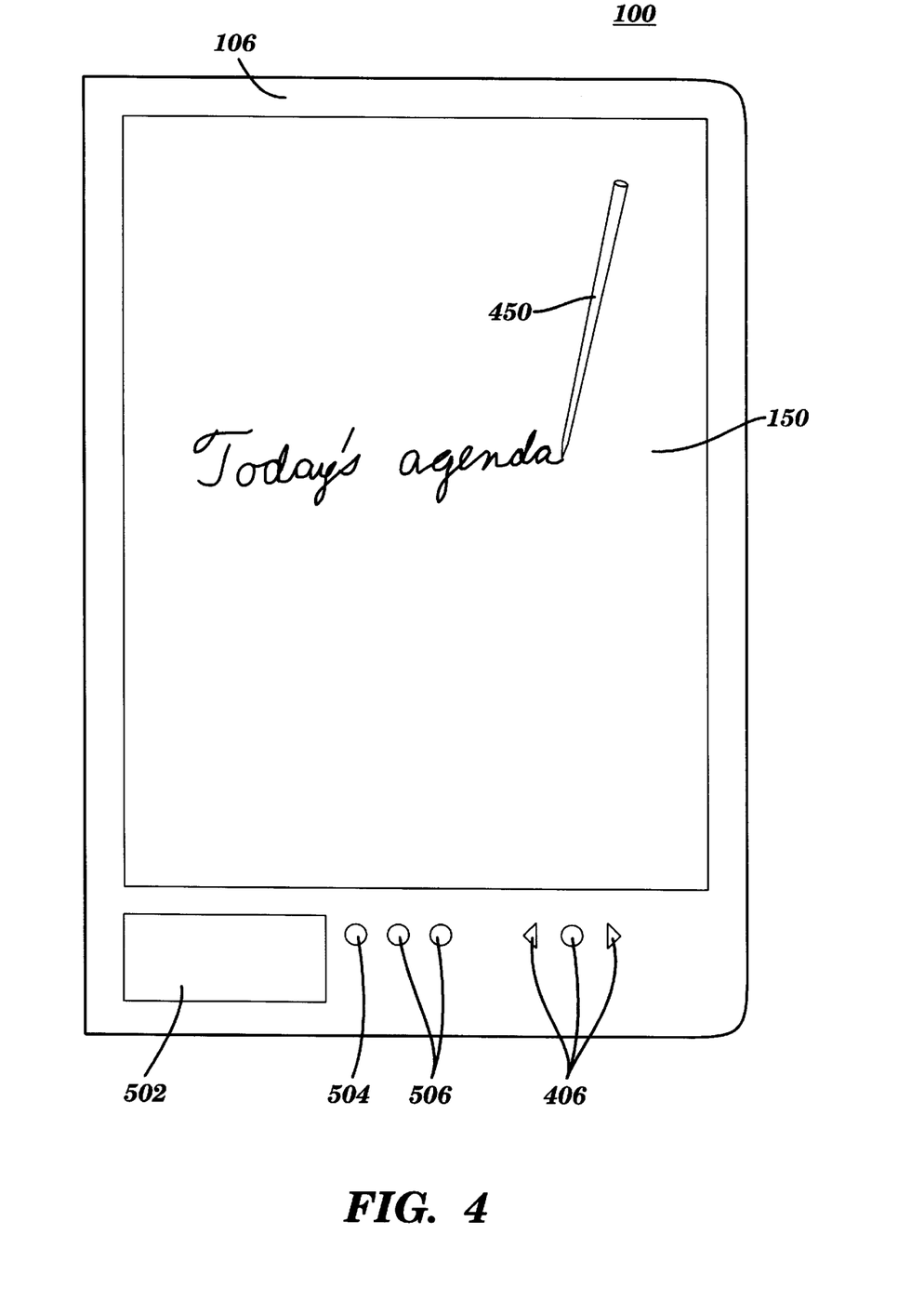
FIG. 4 is a top plan view of the recording medium of FIG. 1, illustrating the recording medium located on the backside of the portable computing device and superimposed with a stylus, and further illustrating a markable surface located between the recording medium and the stylus.

Turning to FIG. 4, recording medium 106, in one example, receives or generates positional information by detecting emissions of a radio frequency from a stylus 450.

Figure 7:
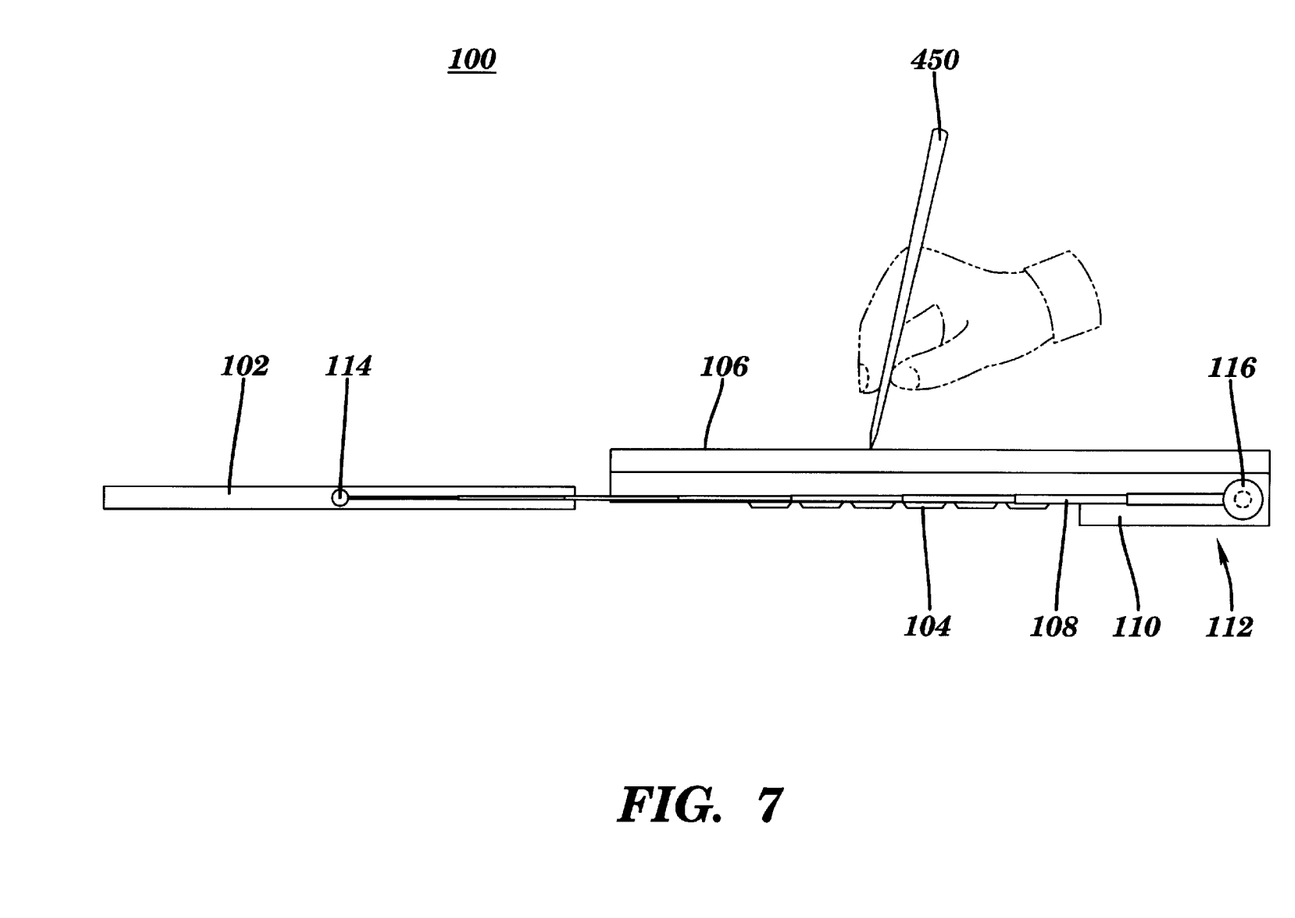
FIG. 7 is an elevation side representation of an exemplary use of the display and the recording medium of the portable computing device of FIG. 1, illustrating exemplary user operation of a stylus superimposing the recording medium, and further illustrating the display extended longitudinally from the recording medium at one end of the portable computing device.
Figure 8:
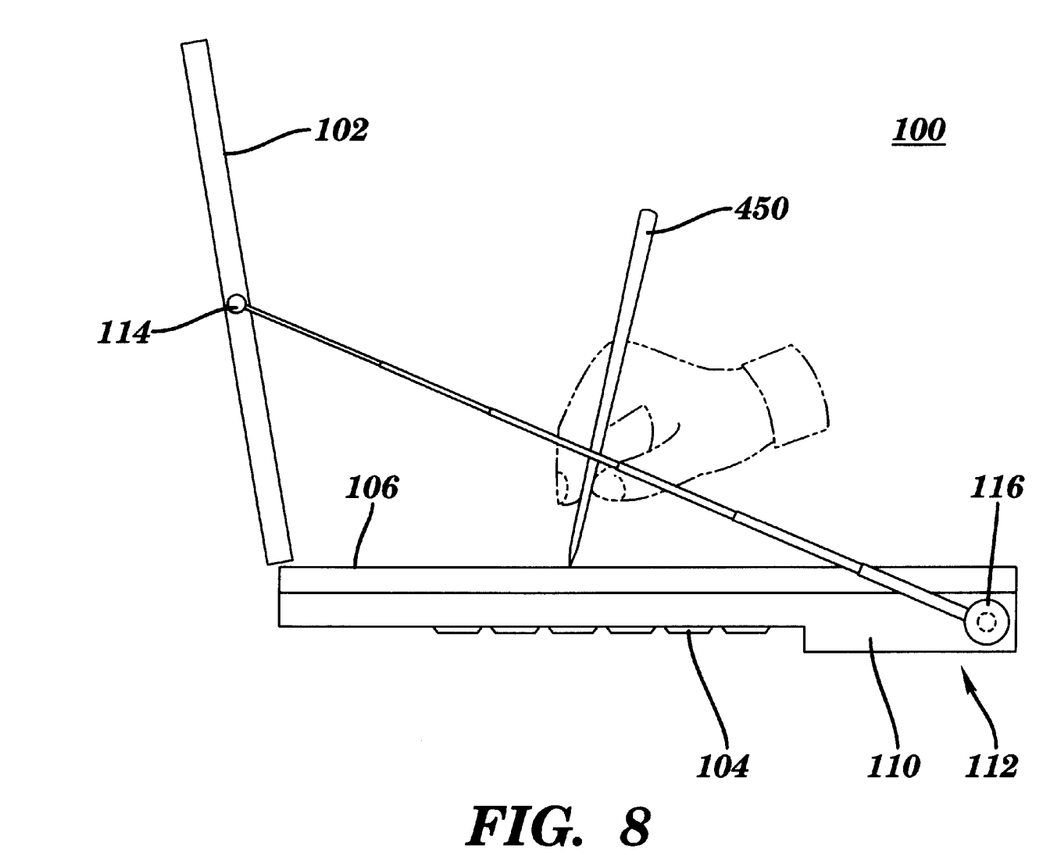
FIG. 8 is an elevation side representation of another exemplary use of the display and the recording medium of the portable computing device of FIG. 1, illustrating exemplary user operation of a stylus superimposing the recording medium, and further illustrating the display inclined at one end of the portable computing device.
Figure 9:
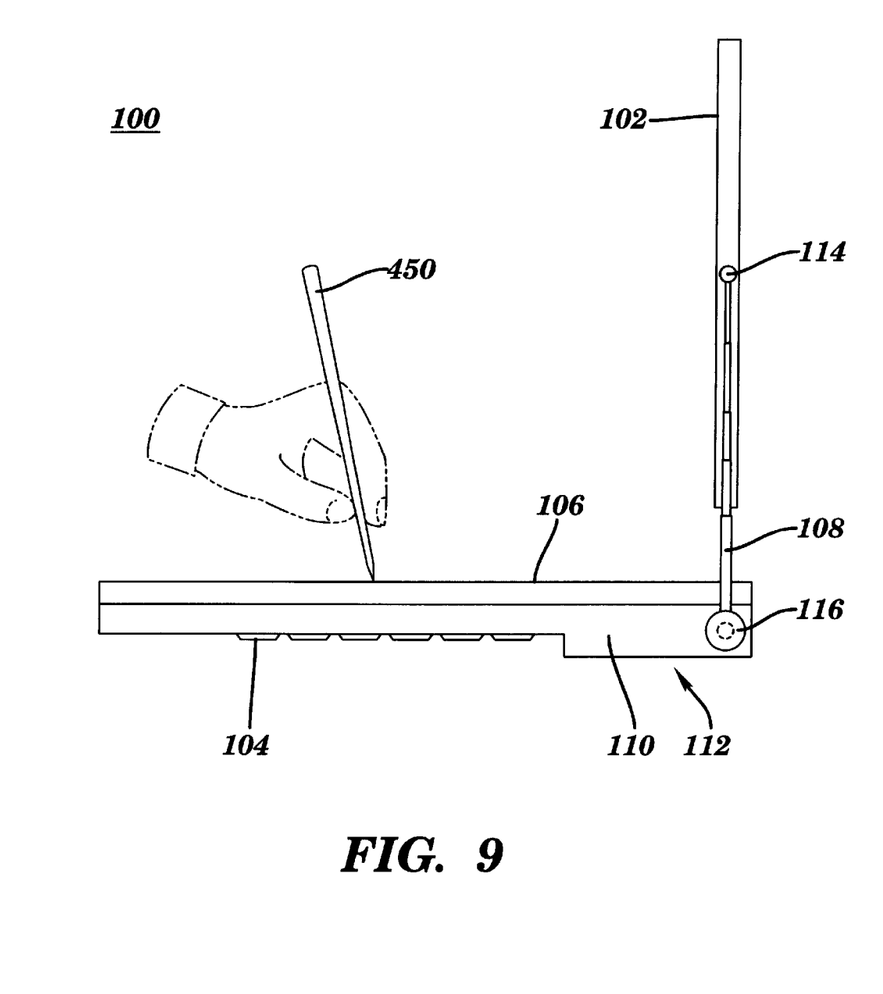
FIG. 9 is an elevation side representation of a further exemplary use of the display and the recording medium of the portable computing device of FIG. 1, illustrating exemplary user operation of a stylus superimposing the recording medium, and also illustrating the display raised at another end of the portable computing device.

Also, stylus 450 includes an electronic inking tip, such as a pressure sensor located therein for generating another radio frequency when stylus 450 is in contact with, for example, markable surface 150 superimposing recording medium 106. By monitoring these positional and inking radio frequencies across a radio-sensitive grid, recording medium 106 generates or cooperates in generating a data stream representative of strokes of stylus 450. Text written on or over recording medium 106 is recorded as "stroke" data. For instance, recognition processes converts the "stroke" data into character strings. Image data is generated from the "stroke" data in order to graphically display the strokes, for example, on display 102 (FIGS. 7–9). Recording medium 106 is used as an electronic tablet, without markable surface 150 located between recording medium 106 and stylus 450. The tip of stylus 450 has physical inking capabilities that allow physical marking of markable surface 150 when laid atop recording medium 106.

Still referring to FIG. 4, markable surface 150 is a top sheet, an intermediate sheet, or a bottom sheet of a number of sheets (e.g., of a pad) of paper positioned in a stack extending outwardly from recording medium 106. Markable surface 150 is laid and/or held on, and/or fastened and/or attached to, recording medium 106. Recording medium 106 has any desired orientation.

Figure 5:
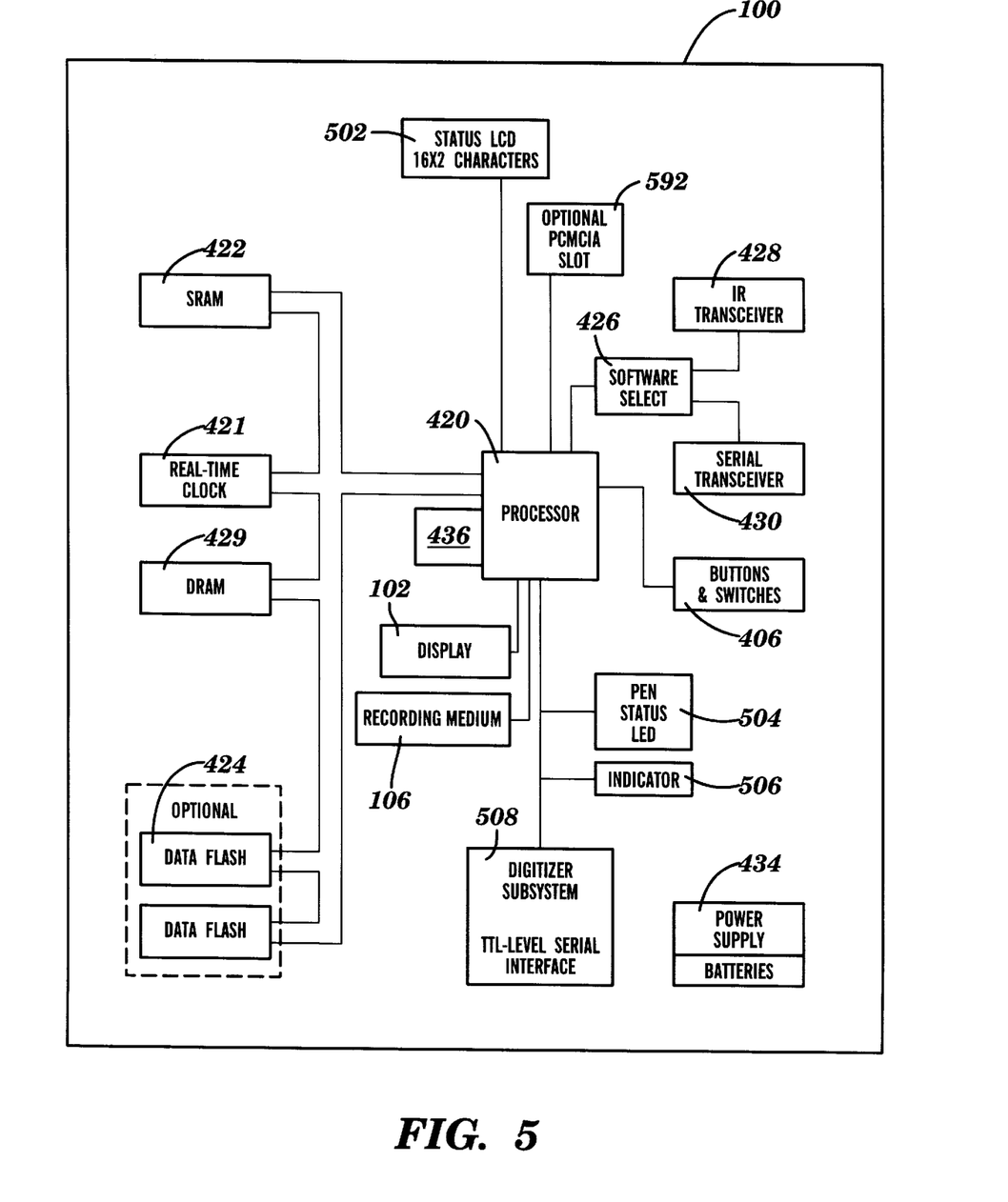
FIG. 5 illustrates a second partial block diagram of one example of components of the portable computing device of FIG. 1.

In further description of recording medium 106 of portable computing device 100, FIG. 5 depicts additional illustrative component connections for portable computing device 100. Referring now to FIGS. 4–5, processing unit 420 is coupled to, for example, display 102, recording medium 106, a number of (e.g., physical or "soft") buttons or switches 406, secondary or supplemental display 502, a number of indicators 504 and/or 506, various data storage devices 422, 424, and 429, one or more logic design implementations 436, real-time clock 421, electrical source 434, and an I/O interface that act through software select 426 and includes infrared transceiver 428 and serial transceiver 430. Processing unit 420 is coupled to digitizer subsystem 508 which includes a digitizing chipset and an electromagnetic sensor. Optionally, PCMCIA slot 592 is coupled to processing unit 420, and is used to attach peripheral devices such as a modem and/or additional memory. Processing unit 420 uses software stored in data storage devices 422, 424, and 429 for managing operation of the components, so a data stream is generated by recording medium 106 and/or digitizer subsystem 508 in response to strokes produced by stylus 450, such as for processing, synchronization, and/or recordation. Processing unit 420 comprises one or more individual or shared (e.g., linked) processors, which access a number of dedicated or shared memory devices, as will be appreciated by those skilled in the art. For instance, one or more electrical sources are shared among the one or more processors, or dedicated to an individual one or group of processors. Further discussion of exemplary components is presented above with reference to FIG. 3. Additional details of exemplary interconnection and operation of such components are provided in the above-incorporated application Ser. No. 09/070,391.

Figure 6:
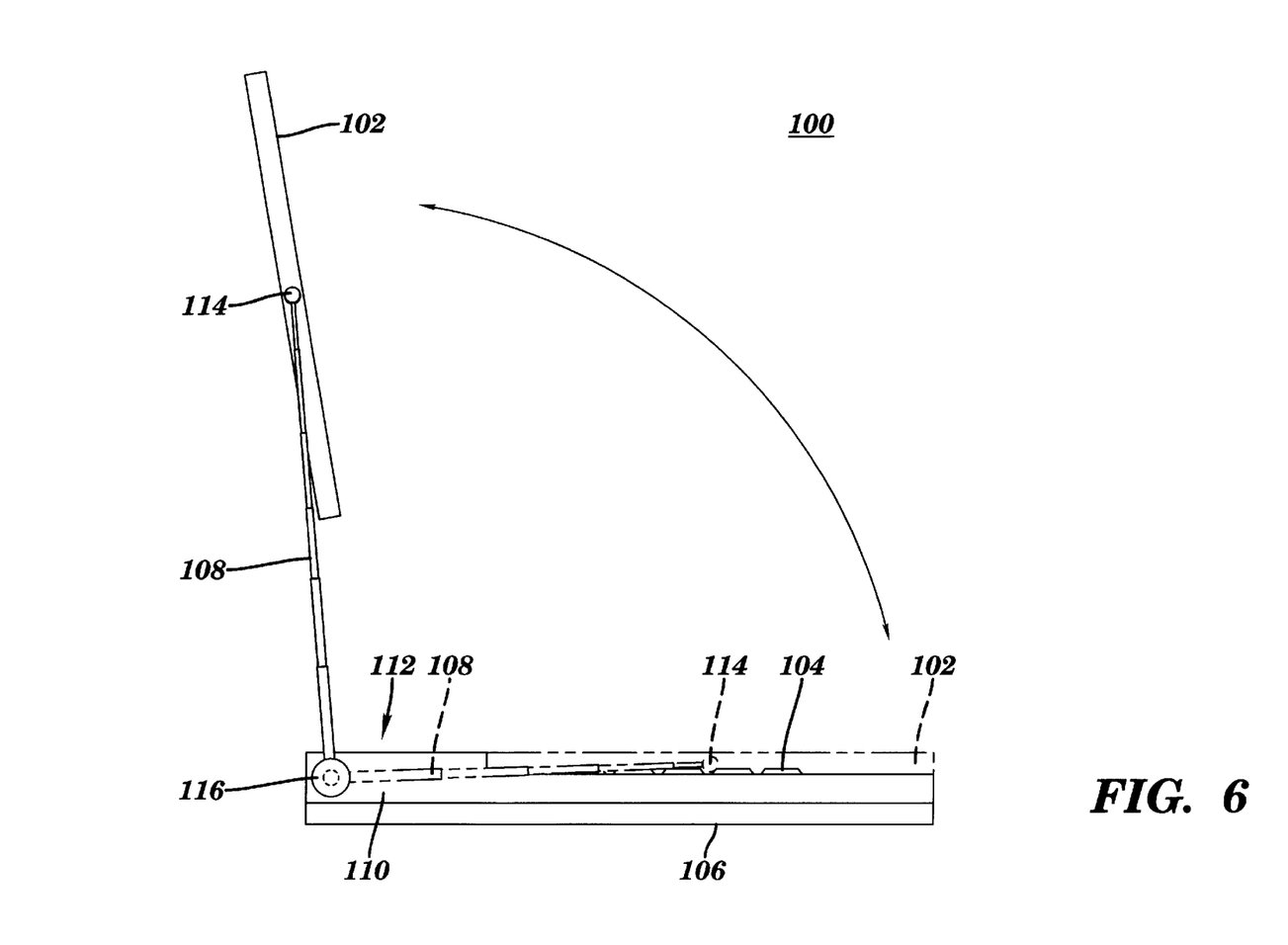
FIG. 6 is an elevation side representation of the portable computing device of FIG. 1, illustrating an exemplary position of the display pivoted and translated above the keyboard with the elongatable arms selectively extended, and further illustrating in phantom an exemplary position of the display folded against the support structure of the portable computing device with the elongatable arms selectively shortened.

Turning to FIG. 6, arm 108 is elongated and pivoted from body 110 to allow user viewing of display 102 in conjunction with keyboard 104. Further, display 102 is pivoted with respect to arm 108 to further enhance the user's viewing of display 102. Arm 108 is shortened and pivoted toward body 110, and display 102 is pivoted with respect to arm 108, so display 102, arm 108, and body 110 are folded or collapsed together to present a slim profile for portable computing device 100, as represented in phantom in FIG. 6.

Advantageously, the user selectively opens display 102 from body 110 in order to operate keyboard 104 in conjunction with display 102. Then, the user desirably folds display 102 against body 110 so portable computing device 100 is transported, carried, or protected as a slender or convenient item. An integration or packaging of recording medium 106 with body 110 and/or electronics for keyboard 104 and/or display 102, advantageously promotes decreased physical bulk, interconnection length, and/or transmission time delay of portable computing device 100. For instance, certain electronics are located within body 110 and rearward of keyboard 104. For example, when folded, portable computing device 100 exhibits overall dimensions such as 0.75 in. thickness, 8.0 in. depth, and 12.0 in. breadth. In addition, portable computing device 100 has an approximate weight of about 3 lbs.

Still referring to FIG. 6, portable computing device 100, in one example, is configured so display 102 is folded against body 110 without resting upon keys of keyboard 104. For instance, body 110 is formed with bars, legs, or rails located about or adjacent to keyboard 104 to protect the keys of keyboard 104 by providing support to display 102. Arm 108 is configured to be folded toward or against body 110 without contacting the keys of keyboard 104. Such bars, legs, or rails provide support to portable computing device 100 when display 102 is pivoted about portable computing device 100 to be used in conjunction with recording medium 106. For example, the bars, legs, or rails provide support upon a surface such as a table, desk, or lap while preventing or reducing contact between the keys of keyboard 104 and the surface. Such support serves to steady or stabilize portable computing device 100 to enhance user operation of recording medium 106 in conjunction with display 102.

Referring now to FIG. 7, in another example, arm 108 is extended longitudinally so display 102 is viewed by a user while operating stylus 450 in conjunction with recording medium 106. For instance, portable computing device 100 is flipped over or turned relative to a direction in which the user would type upon keyboard 104, and display 102 is flipped over or turned between arms 108 so the user views display 102 while viewing, using, or interfacing with recording medium 106. Such a location or disposition of display 102 enhances acceptability and unobtrusiveness of portable computing device 100 in a setting such as a meeting among persons seated about a table upon which portable computing device 100 is placed. For instance, the extension of display 102 to be visible to the user while operating stylus 450 with recording medium 106, yet flattened to avoid obstruction of vision between the user and the other persons as well as between the other persons and recording medium 106 (e.g., or markable surface 150, FIG. 4, laid atop recording medium 106) enhances openness, productivity, confidence, teamwork, trust, collaboration, and/or cooperation among attendees at or participants in the meeting.

Referring to FIG. 8, display 102 is inclined to provide a certain angle for viewing of display 102 in conjunction with recording medium 106. For instance, an inclination of display 102 is selected by the user to promote easy and ready exhibition of information for the user.

Now referring to FIG. 9, display 102 is moved to present a viewing position with little inclination while raised above recording medium 106. Such a position accommodates a different posture (e.g., reclining, lying, bending, or leaning) of the user, or a separate user having a relatively shorter or smaller stature.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A portable computing device, comprising:
   a support structure having a body including a first face portion and a second face portion, said first face portion generally directed in a first direction, said second face portion generally directed in a second direction, said second direction being different from said first direction;
   a processing unit supported with said body;
   a keyboard coupled with said processing unit and having keys forming said first face portion, said keyboard configured to communicate a first datum to said processing unit in response to a user operation of said keyboard;
   a recording medium coupled with said processing unit and forming said second face portion, said recording medium configured to communicate a second datum to said processing unit in response to a user operation of a stylus when said recording medium is superimposed with said stylus; and
   a display, separate from said recording medium, coupled with said processing unit and movably connected with said body, said display movable to a first location and a second location, said first location allowing user viewing of said display during said user operation of said keyboard, said second location allowing user viewing of said display during said user operation of said stylus.

2. The device of claim 1, wherein said display is connected with said body by an extendable arm.

3. The device of claim 2, wherein said extendable arm includes a part connected with at least one of said body and said display by a hinge.

4. The device of claim 2, wherein said extendable arm comprises at least one of a telescopic, shortenable, elongatable, foldable, unfoldable, and collapsible arm.

5. The device of claim 2, wherein said extendable arm comprises a first extendable arm, said first extendable arm pivotally connected with said body and said display, and further comprising a second extendable arm, said second extendable arm pivotally connected with said body and said display.

6. The device of claim 1, wherein said display is at least one of pivotable and translatable to said first location and said second location.

7. The device of claim 1, wherein said first location allows user viewing of a first visual element of said display, said first visual element responsive to said first datum, wherein said second location allows user viewing of a second visual element of said display, said second visual element responsive to said second datum.

8. The device of claim 7, wherein said first visual element comprises at least one of a first text element and a first graphic element, and wherein said second visual element comprises at least one of a second text element and a second graphic element.

9. The device of claim 1, wherein said recording medium is superimposable with a removable markable surface, wherein said stylus allows user marking on said markable surface when said recording medium is superimposed with said markable surface, wherein said user operation of said stylus provides a stroke signal and a stroke mark, said stroke signal conveying to said recording medium a section of information, said section of information causing said recording medium to communicate said second datum to said processing unit, said stroke mark conveying to said markable surface said section of information.

10. The device of claim 1, wherein said display is foldable against a part of said body.

11. The device of claim 1, wherein said first direction is generally opposite to said second direction.

12. A portable computing device, comprising:

a support structure having a body;

a processing unit supported with said body;

a keyboard coupled with said processing unit and connected with said body, said keyboard configured to communicate a datum to said processing unit in response to a user operation of said keyboard;

an elongatable arm pivotably connected to and pivotable about an outermost side face of said body; and a display coupled with said processing unit and connected with said elongatable arm, said elongatable arm allowing relative movement between said display and said body along a longitudinal axis of said elongatable arm to move said display to a selected location, said selected location of said display allowing user viewing of said display during said user operation of said keyboard.

13. The device of claim 12, wherein said elongatable arm comprises at least one of a telescopic, shortenable, extendable, foldable, unfoldable, and collapsible arm.

14. The device of claim 12, wherein said elongatable arm includes a part connected with at least one of said body and said display by a hinge.

15. The device of claim 12, wherein said datum comprises a first datum, wherein said selected location comprises a first location, and further comprising a recording medium coupled with said processing unit and connected with said body, said recording medium being separate from said display and configured to communicate a second datum to said processing unit in response to a user operation of a stylus when said recording medium is superimposed with said stylus, wherein said elongatable arm allows relative movement between said display and said body to move said display to a second location, said second location of said display allowing user viewing of said display during said user operation of said stylus.

16. The device of claim 15, wherein said body includes a first face portion and a second face portion, said first face portion generally directed in a first direction, said second face portion generally directed in a second direction, said second direction being generally opposite to said first direction, wherein keys of said keyboard form said first face portion, and wherein said recording medium forms said second face portion.

17. The device of claim 12, wherein said display is foldable against a part of said body.

18. The device of claim 12 wherein said elongatable arm is capable of pivotal movement relative to said body through greater than 180 degrees.

19. The device of claim 12 wherein said elongatable arm is capable of pivotal movement relative to said body through 360 degrees.

20. A portable computing method, comprising:

employing keys of a keyboard to form a first face portion of a body of a support structure, said first face portion generally directed in a first direction;

employing a recording medium to form a second face portion of said body, said second face portion generally directed in a second direction, said second direction being different from said first direction, said recording medium configured to receive a signal from a user operation of a stylus when said recording medium is superimposed with said stylus; and movably connecting a display with said body, said display being separate from said recording medium and movable to a first location and a second location, said first location allowing user viewing of said display during a user operation of said keyboard, said second location allowing user viewing of said display during said user operation of said stylus.

21. The method of claim 20, further comprising forming a part of said display to be receivable by said body.

22. The method of claim 20, wherein said movably connecting said display with said body comprises movably connecting an arm with said body, and movably connecting said arm with said display.

23. The method of claim 22, further comprising forming a part of said arm to exhibit rigidity.

24. The method of claim 20, further comprising employing said display to allow user viewing of a first visual element responsive to said user operation of said keyboard, and employing said display to allow user viewing of a second visual element responsive to said user operation of said stylus.

\* \* \* \* \*